United States Patent
Mont-Reynaud et al.

(10) Patent No.: US 11,132,504 B1
(45) Date of Patent: Sep. 28, 2021

(54) FRAMEWORK FOR UNDERSTANDING COMPLEX NATURAL LANGUAGE QUERIES IN A DIALOG CONTEXT

(71) Applicant: SoundHound, Inc., Santa Clara, CA (US)

(72) Inventors: Bernard Mont-Reynaud, Sunnyvale, CA (US); Christopher S Wilson, Sunnyvale, CA (US); Keyvan Mohajer, Los Gatos, CA (US)

(73) Assignee: SoundHound, Inc., Santa Clara, CA (US)

( * ) Notice: Subject to any disclaimer, the term of this patent is extended or adjusted under 35 U.S.C. 154(b) by 140 days.

(21) Appl. No.: 16/363,929

(22) Filed: Mar. 25, 2019

Related U.S. Application Data

(60) Provisional application No. 62/648,868, filed on Mar. 27, 2018.

(51) Int. Cl.
  *G06F 40/205* (2020.01)
  *G06F 40/30* (2020.01)

(52) U.S. Cl.
  CPC .......... *G06F 40/205* (2020.01); *G06F 40/30* (2020.01)

(58) Field of Classification Search
  CPC ............................. G06F 40/30; G06F 40/205
  See application file for complete search history.

(56) References Cited

U.S. PATENT DOCUMENTS

| | | | | |
|---|---|---|---|---|
| 5,696,962 A * | 12/1997 | Kupiec | ............... | G06F 16/3338 |
| 6,408,294 B1 * | 6/2002 | Getchius | ........... | G06F 16/24534 |
| 8,543,590 B2 * | 9/2013 | McLoughlin | ..... | G06F 16/24522 707/760 |
| 8,561,014 B2 * | 10/2013 | Mengusoglu | ............ | G06F 8/10 717/104 |
| 9,286,910 B1 * | 3/2016 | Li | ........................ | G06F 16/3329 |
| 9,569,729 B1 * | 2/2017 | Oehrle | ................ | G06Q 10/063 |
| 10,418,032 B1 * | 9/2019 | Mohajer | ............. | G06F 16/3329 |
| 2007/0208727 A1 * | 9/2007 | Saklikar | .................. | G06F 16/28 |
| 2008/0010259 A1 * | 1/2008 | Feng | ................... | G06F 16/9537 |
| 2009/0234904 A1 * | 9/2009 | Dalgliesh | .......... | G06F 16/24539 709/201 |
| 2009/0265304 A1 * | 10/2009 | Ait-Mokhtar | ........... | G06F 16/30 |

(Continued)

*Primary Examiner* — Shaun Roberts
(74) *Attorney, Agent, or Firm* — Bachmann Law Group PC

(57) ABSTRACT

A domain-independent framework parses and interprets compound natural language queries in the context of a conversation between a human and an agent. Generic grammar rules and corresponding semantics support the understanding of compound queries in the conversation context. The sub-queries themselves are from one or more domains, and they are parsed and interpreted by a pre-existing grammar, covering one or more pre-existing domains. The pre-existing grammar, extended by the generic rules, recognizes all compound queries based on any queries recognized by the pre-existing grammar. Use of the disclosed framework requires little or no change in the domain-specific NLU handling code. The framework defines a generic approach to propagating context data between sub-queries of a compound query. The framework can be further extended to propagate intra-query context data in, out and across query components. Complex query results, and other data such as accounting data, can also be propagated simultaneously with dialog context data in a consolidated intra-query context data structure.

31 Claims, 15 Drawing Sheets

(56) References Cited

U.S. PATENT DOCUMENTS

| | | | | |
|---|---|---|---|---|
| 2010/0058113 | A1* | 3/2010 | Rapp | G06F 11/366 |
| | | | | 714/38.14 |
| 2014/0310002 | A1* | 10/2014 | Nitz | G10L 15/22 |
| | | | | 704/270.1 |
| 2015/0379013 | A1* | 12/2015 | Purcell | G06F 16/3329 |
| | | | | 707/708 |
| 2015/0382047 | A1* | 12/2015 | Van Os | G09C 1/00 |
| | | | | 725/38 |
| 2018/0232662 | A1* | 8/2018 | Solomon | G10L 17/22 |
| 2019/0129695 | A1* | 5/2019 | Malur Srinivasan | |
| | | | | G06F 40/253 |

* cited by examiner

```
/* Mapping function declarations for FIG. 9 */

/* Note: When a mapping is the identity mapping, the
function can be omitted. This is a frequent situation. */

IQC * B_to_C ( IQC * s); /* Stands for F_C */
IQC * B_to_D ( IQC * s); /* Stands for F_D */
IQC * B_to_E ( IQC * s); /* Stands for F_E */
IQC * B_Out ( IQC * s);  /* Stands for F_O */

/* Parsing function for FIG. 9 */

IQC * Parse_B( IQC * BIS )
{
      IQC * COS, DOS, EOS, BOS;

COS = Parse_C( B_to_C( BIS ) );
      DOS = Parse_D ( B_to_D( COS ) );
      EOS = Parse_E( B_to_E( DOS ) );
      BOS = B_Out( EOS );
      Return BOS;
}
```

FIG. 10

1. \<QUERY\> ➔ who is \<PERSON\>
2. \<QUERY\> ➔ who are \<PERSON_PL\>
3. \<PERSON\> ➔ PROPER_NAME
4. \<PERSON\> ➔ the father of \<PERSON\>
5. \<PERSON\> ➔ \<PERSON_POSS\> father
6. \<PERSON\> ➔ \<PERSON_POSS\> dad
7. \<PERSON\> ➔ the mother of \<PERSON\>
8. \<PERSON\> ➔ \<PERSON_POSS\> mother
9. \<PERSON\> ➔ \<PERSON_POSS\> mom
10. \<PERSON_PL\> ➔ the children of \<PERSON\>
11. \<PERSON_PL\> ➔ \<PERSON_POSS\> children
12. \<PERSON_PL\> ➔ \<PERSON_POSS\> kids
13. \<PERSON_POSS\> ➔ \<PERSON\>'s
14. \<PERSON_POSS\> ➔ his
15. \<PERSON_POSS\> ➔ her

FIG. 13

FRAMEWORK FOR UNDERSTANDING COMPLEX NATURAL LANGUAGE QUERIES IN A DIALOG CONTEXT

FIELD OF THE INVENTION

The present invention is in the field of natural language understanding, and more specifically, of intelligent natural language conversational agents.

BACKGROUND

Current natural language virtual agents process queries from users. Queries may also be called expressions, commands, or requests. A natural language expression may ask for information (a query) or ask for action (a command). In this disclosure, the term query is used to refer to the various kinds of requests a user can make.

Virtual assistants usually handle a variety of domains. A domain is a set of natural language queries and associated meanings that serve a particular type of information need or service request. Many domains are in use in current systems. Examples are:

- the "weather domain" provides weather forecasts for specified locations and at specified times, and can also answer to statistical questions about weather;
- the "restaurant domain" helps users find restaurants that meet their criteria for location, cuisine, price, rating, hours open, and so on;
- the "stock domain" answers questions about stock prices;
- the "home domain" handles home automation commands (turn up the heat to 70);
- the "automobile domain" recognizes commands such as (roll down the back windows), and typically has different versions specialized for each type of car.

For a conversational agent, an awareness of the conversation context is key to understanding queries that are expressed in a natural way. The proper handling of the context of a conversation or dialog is thus essential for understanding queries. This is important for compound queries in particular.

A compound natural language query is a conjunction of two or more sub-queries, each of which qualifies as a query in its own domain. Current natural language virtual assistants do not handle compound queries satisfactorily, especially across domains. If they handle compound queries at all, they are not able to propagate context information correctly or efficiently across sub-queries, and there is no framework to allow an NLU developer to write code that can take advantage of conversational context information, and to update it. The need for efficiency refers in particular to the ability of a framework to handle context information at scale, in an online, real-time manner.

SUMMARY

The presently disclosed technology provides a framework for recognizing (i.e., parsing and interpreting) natural language queries in the context of a conversation (a.k.a. dialog) between a human and an agent. A set of domain-independent semantic grammar rules are described for the recognition of compound queries. If a grammar can parse and interpret singleton queries in one or more domains, the grammar can be extended by the generic rules and can then recognize compound queries that are conjunctions of singleton queries that the original grammar recognizes, as well as others that become recognizable though the use of context information.

The methods are domain-independent, and operate in the same manner, whether the sub-queries are from different domains or not. Further, the NLU code for a domain need not know whether it is handling a query or a sub-query. The present technology provides a template, or framework, for defining the NLU code and the manner in which it propagates intra-query context.

The term Conversation State (CS for short) refers to a data structure designed to represent semantic context information that is carried form one query to the next in the context of a conversation. In the disclosure, the use of "CS" can be a reference to an instance of a CS data structure, or to the data it contains. A closely related term is Intra-Query Context (IQC). This term refers to a data structure designed to represent and update semantic context information during the parsing and interpretation of a query. In the disclosure, the use of "IQC" is can be a reference to an instance of an IQC data structure, or to the data it contains. The CS and IQC are very similar. But unlike the CS, which is only used between dialog turns, the IQC is used during the entire processing of a query. The assistant updates the CS data at each dialog turn; the outgoing CS from a query serves as incoming CS for the next query. As discussed below, some of the CS data can be forgotten, discarded, or marked as not current after becoming obsolete, for example due to the passage of time, or being replaced by new information. In some instances, the present technology supports the ability to remember past associations that are no longer in effect.

In some instances, a CS (or IQC) is implemented as an associative memory data structure that stores context information as a collection of key-value pairs. Typically, the key is a semantic variable, and the value can be atomic, such as a number or an entity, a simple structure such as a set or list of atomic values, or it may be a more complex structure, such as an expression possibly involving semantic variables and functions. Semantic expressions may be evaluated, unevaluated, or stored both ways. A CS or IQC can efficiently store the amount of semantic context sufficient to support the application. Efficiency is achieved by easy access (such as a lookup based on a key or an index), fast editing operations, and storage economy. Hash maps, structs and arrays are all useful, according to best practices for the context information needs.

There are many possible embodiments of associative memories. When storing a collection of key-value pairs, the collection can be a list, or a set. In the case of a set, at most one value is stored for any key. This is often implemented by a hashmap without further ado. Some values may be associated with a dialog turn, or may be time-stamped according to wall clock. Some hash maps may be turn-stamped or time-stamped in the same way. In some instances, entries are automatically forgotten when they have been stored for a certain amount of time, or for a certain number of dialog turns. In some instances, associations are given a weight or strength. The weight may have an effect on the retrieval of context information, especially when multiple values compete for attention. In some instances, weak associations may be forgotten sooner than strong ones.

The operations on associative memory may involve insertion of a new key-value pair, deletion of a key-value pair, replacement of the value for a key by a new value, insertion or deletion of replacement of a value in a value list for a pair, and so on, with expected variants using turn numbers, clock time, and/or strength. In some instances, the semantic context (CS or IQC) consists of (Object, Attribute, Value) triples, possibly stored in a triple store. In some instances, the semantic context is represented by a collection of logic formulas, such as formulas in first order logic or higher order logic, where semantic variables, predicates and functions are associated with syntactic elements and rules that arise during the parse. In some instances, incoming and outgoing CS data is based on yet other semantic representations. The most distinct characteristic of the semantic context in this disclosure is not its exact structure, but the manner in which it is systematically propagated in a syntax-directed manner, as explained later.

In some instances, a CS data structure is preserved from one query to the next query in the dialog, and for this reason, is implemented as a persistent (serialized) data structure. In contrast, the IQC is only used during the parsing a query, and for this reason, is desirable in some cases to implement as a volatile (non-serialized) data structure.

The disclosed methods will represent, update and propagate context information across subsequent queries during a dialog (CS), across sub-queries of a compound query (IQC), and within the processing of a query (IQC). The terms CS and IQC will usually be treated as distinct, but much of what can be said about one also applies to the other, as a person in the art will easily recognize.

The response to a compound query is normally based on enumerating the results of all the sub-queries in order. In an instance, partial lists of results are propagated along with IQC data in a merged structure. This is discussed in more detail below with respect to FIG. 8A. In another instance, results are returned accumulated directly, separate from IQC data, as discussed in with respect to FIGS. 5-6.

Though compound queries represent, propagate, maintain and use context information in order to fully understand queries, any complex queries with parts and sub-parts may require such an intra-query mechanism. A framework is presented to generalize the use of intra-query context, and propagate and update IQC representations, to arbitrary complex queries. The present disclosure focuses on top-down left-to-right parsing, including incremental semantic parsing. The use of such a mechanism allows relatively simple semantic grammars (or NLU code) to handle fairly complex queries.

BRIEF DESCRIPTION OF THE DRAWINGS

FIG. 10 shows exemplary program code that implements the semantic parsing and data flow of the example from FIG. 9.

FIG. 13 shows an exemplary context-free grammar that can parse the underlined sub-query of the complex query How old is Barak Obama and who are his Dad's kids.

DETAILED DESCRIPTION

Introduction

Figure 1:
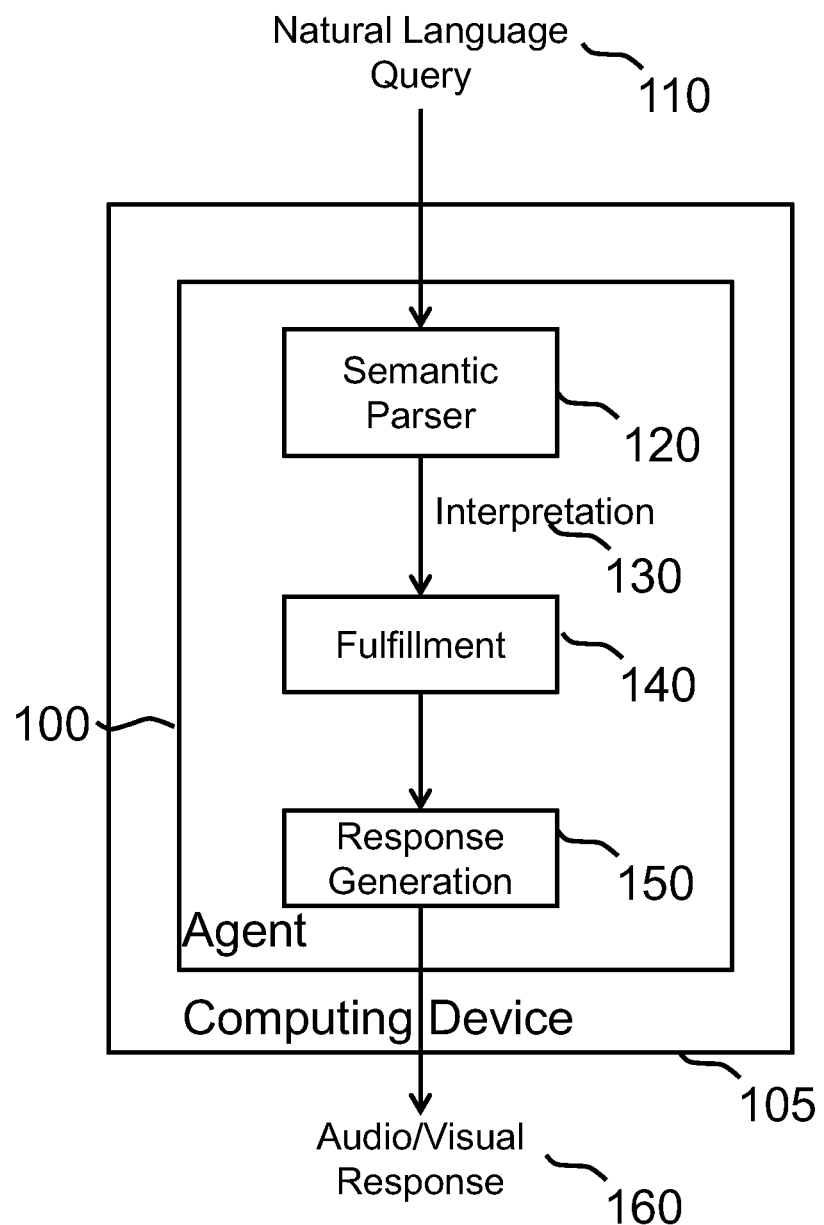
FIG. 1 shows an exemplary high-level block diagram of a natural language agent.

Key concepts are introduced by examples before formal definitions. Compound queries are examined first, with the goal of propagating semantic context information from one sub-query to the next. The propagation of semantic context information across finer-grained components of a query processing will be examined second.

In the examples, queries (and generally, a user's spoken or written input) are in italics, and sub-queries of a compound query are underlined.

Example 1

Find an Upscale Bar Downtown, Parking Nearby, and Navigate to it

In Example 1, the interpretation of downtown requires what is commonly called coreference resolution: a specific referent in needed for the phrase downtown. In one instance, a referent could be determined based on the dialog context, or failing that, based on the location of the user, and information about nearby towns. Having found downtown, choosing a referent for upscale bar can be done using a database of local bars and restaurants. In both cases, the choices would be made during the semantic parsing of the sub-query find an upscale bar downtown. Intra-query context processing, and how it helps resolve implicit or explicit references, is discussed later.

Regarding parking nearby, the absence of a verb can be remedied by using the Intra-Query Context (IQC) to access the previous verb, find, and use it again. Further, the use of nearby makes an implicit reference to a location, which is resolved (by coreference resolution, again) to the upscale bar from the previous sub-query. The word nearby calls for reasonable proximity, which (as common sense suggests) should be based on walking distance, i.e., the parking spot should not be too far for walking. In fact, how far is too far should also depend on the weather . . . . Such domain-dependent considerations are not a part of the disclosed framework, but the focus is on the propagating of state information during the parsing and interpretation of queries.

The meaning of it in navigate to it is determined by co-reference resolution. The co-reference resolution problem is well known in linguistics; algorithms exist to address it, when provided sufficient context information about the prior conversation. In the absence of indications to the contrary, co-reference resolution will select a recently mentioned entity from the preceding conversation, one that is a good match in terms of semantic type (in this case, a location is expected) and other semantic properties, such as gender. Should it refer to the upscale bar, or to the parking (spot)?

In a naïve instance of co-reference resolution, the parking spot is chosen as a recently mentioned location, because semantics agree: navigation can aim for the parking spot (then perhaps for the bar). Example 1 thus illustrates the central role played by the context of prior conversation in understanding queries and sub-queries.

Co-reference resolution is addressed using context data as conversation state data (CS) or intra-query context data (IQC). In a typical implementation, the CS and IQC data are the same; otherwise, the CS can be converted to an IQC before processing. The above discussion of Example 1 suggests that the understanding of a query or sub-query steps such as:

(a) receiving context data from an earlier query, or an incoming IQC from an earlier query component; an incoming CS from an earlier query is mapped to an incoming IQC;

(b) updating the incoming IQC, using new information obtained while parsing and understanding the query or sub-query; and (c) returning an outgoing IQC for subsequent parsing and dialog, based on the updated IQC.

Similar considerations apply between queries (full dialog turns) and between sub-queries of a single compound query.

Example 2 what are the capitals of japan and china also tell me their populations, which one is larger and by how much, and what are their GDP and[4] average income per capita?

Example 2 is a fairly complex example that illustrates several conjunctive forms, and the different ways in which they function, depending on their grammatical roles. The first instance of the conjunction and in the phrase what are the capitals of japan and china binds two nouns together. Such intra-query conjunctions can occur between noun phrases (the capital of china and the population of Japan), adjectives (a large and beautiful bird), prepositions (above and below the table), adverbs (he spoke slowly and carefully) and other grammatical categories mentioned in English grammar textbooks.

Intra-query conjunctions such as those listed above do not operate between sub-queries. The focus of compound queries is on clause-level conjunctions, such as also and and between the phrase which one is larger and what are their GDP and average income per capita in Example 2, which join sub-queries. As a first approximation, a sub-query corresponds to what is known in English grammar as an independent clause. A clause is a group of words that contains at least a subject and a verb. A dependent clause is a clause that does not form a complete thought; it cannot stand on its own as a sentence. A dependent clause must be attached to an independent clause to form a sentence. An independent clause is a clause that stands as a sentence on its own. Independent clauses can be joined (or coordinated) by conjunctions (Examples: John is tall but his older brother is short; and I bought the watch, although it was expensive). Compound queries are a case of such coordination. As a first approximation, sub-queries could be defined as independent clauses.

However, some sub-queries are not actually clauses, in that they lack a subject or a verb. Some groups of words are not well-formed grammatical clauses in English, but they may function semantically as if they were. This happens if a group of words may be interpreted, in its context, as if it were an independent clause that stands on its own. Returning to Example 2, the phrase by how much does not look on the surface like an independent clause; in particular, it does not have a subject and a verb. This would seem to suggest that and in the phrase which one is larger and by how much is not a conjunction between clauses. However, in the context of the preceding dialog (what are the capitals of japan and china; tell me their populations; which one is larger) a numerical comparison is made between the populations of Japan and China. The expected outcome (and corresponding response) would be the population of China is greater than that of Japan, and in the context of this response, by how much makes a completely understandable question. It is not a complete sentence in the grammatical sense, but it functions as one. Generally, after a question such as is X greater than Y? the question by how much is a well-formed query, whose correct answer is ||X−Y||, the absolute difference of X and Y.

The point is that, in some conversation contexts, by how much could be (or should be) treated as a well-formed sub-query. A semantic grammar for English presumably requires a "simple math" domain sub-grammar to parse and understand this sub-query, provided that it finds in the preceding dialog a numerical comparison operator that implicitly makes reference to a difference of two quantities. The techniques disclosed do not provide such grammar. Rather, they only provide the "glue" that binds sub-queries together, by propagating a data structure representing (at least) the conversation context. Such a data structure might be called "Query Glue" because it semantically binds each query or query component to the next one.

In light of this, in some instances, a definition of sub-queries can be as follows: a query or sub-query is an independent clause, or a phrase that, in the dialog context, can be parsed and understood as an independent clause. Sub-queries are not always sentences on their own, but (in context) they act if they were. In Example 2, the first and the fourth occurrences of and are noun phrase conjunctions; they are not conjunctions between clauses, that is, sub-queries. The compound query of Example 2 thus decomposes into sub-queries as shown below:

Example 2—Division into Conjunctive Sub-Queries 1. what are the capitals of japan and china (joiner: also)
2. tell me their populations (joiner: or none)
3. which one is larger (joiner: and)
4. by how much (joiner: and)
5. what are their GDP and average income per capita.

The decomposition into sub-queries is not performed from the outside in as per the discussion above, but as a natural outcome of parsing the compound query.

It may be surprising that Example 2 has (appears to have) no syntactic ambiguity. In some cases, ambiguities are present. For example, the compound query what is the weather in SF tomorrow call mom and text dad could be understood as what is the weather in SF tomorrow followed by call mom followed by text dad or as what is the weather in SF followed by tomorrow call mom followed by text dad where the second interpretation, which asks for the weather today, and calling mom tomorrow, seems less likely on statistical grounds—according to either a language model, or a stochastic grammar. In an instance, the most likely interpretation is chosen. In another instance, and especially when a side effect is involved, the system might ask the user to clarify the meaning, e.g.: did you want to call mom tomorrow?

Ambiguities do not interfere with the use of the compound query framework. In effect, the disclosed approach provides the super-structure, or framework, to handle compound queries generically; it relieves domain-specific NLU code from the need to handle compound queries. The understanding of queries in specific domains, of course, is left to domain-specific NLU code—or shared NLU code, such as the "simple math" domain sub-grammar mentioned above.

The techniques discussed so far address compound queries, where context data propagates laterally (or horizontally) from one top-level sub-query to the next. The following query may still be considered a compound query: How old is Barak Obama, who are his kids and what is their age difference?

But these techniques do not address more complex queries, which require context data to be propagated deeply into components of queries, and be modified at any level. An example of such a complex query is: How old is Barak Obama and who are his Dad's kids? The grammar-driven framework is extended to systematically propagate context data, so as to be able to answer such complex queries. Complex query results, and other data such as accounting data, can also be propagated simultaneously with dialog context data in a consolidated intra-query context data structure The technology described herein relates to the technical problem of parsing natural language compound queries. Most natural language parsers are designed to receive, process, and parse a single query. These prior systems are not designed to recognize multiple queries in an utterance received from a user or other source. Rather, they are designed with modules, logic, and datastores to recognize a single query, parse the single query, and perform actions in an attempt to satisfy the single query.

The present technology solves the issue of parsing natural language compound queries by implementing sub-query parsers which handle portions of an original query. Subqueries are performed by parsing modules that receive information from a previous parser, parse at least a portion of the compound query, output a result, and then provide information to the next parser until all sub-query parsers have processed the received compound query. By using a series of sub-query parsers, the present technology efficiently and effectively solves the issue of parsing natural language compound queries.

Another technical problem exists with respect to how to efficiently process a compound query with context information. Previous systems struggle with, if not fail, handling the context of a single query. Handling a context for a compound query presents an even greater problem which current systems fail to solve.

The present technology solves the issue of processing a compound query with context information by providing an infrastructure for updating and communicating context data between each and every sub-query parser of a parsing module. Context can be processed when the compound query is first received by a processor and as the compound query has completed parsing the compound query. The context can also be accessed and/or modified, through a mapping of a context data structure, after each and every sub-query parser has parsed by a portion of the incoming compound query. In this way, the context can be continuously updated and propagated through a series of sub-query parsers that collectively parse a compound query. By propagating and continuously updating a context using a plurality of sub-query parsers, the present system solves the issue of processing a compound query with context information.

Overview of the System

FIG. 1 shows a high-level block diagram of a natural language agent 100, in an instance. The agent 100 receives, from a user or other source, a spoken or written natural language query 110. A semantic parser 120 takes the query 110 as input and extracts its meaning, called an interpretation. The interpretation 130 is generated as a data structure that represents (i.e., encodes) the query's meaning, as it is recognized or understood by the semantic parser. Many different types of semantic parsing algorithms are known in the art, such as for example grammar-based parsing algorithms. The extraction of semantics (or meaning) can be syntax-driven, in some instances. In all cases, the term semantic parser is used for the process of converting a valid query in to an interpretation 130. Invalid queries are handled separately.

Based on the interpretation data structure 130, the agent 100 fulfills a valid query's intent by retrieving information (for an information request such as will it rain in Seattle on Sunday) or taking action (turn off the lights) or a combination (book the cheaper flight) at fulfillment 140. In most cases, the response generation module creates a response for the user based on action taken and/or information received by the fulfillment unit 140. The response can in general be audio/visual, and it may involve spoken text, written text, images, music or video.

Agent 100 is implemented on computing device 105. Computing device 105 may be implemented as one of several devices, including but not limited to a desktop computer, mobile device such as cellular phone, tablet computer or laptop computer, a smart home virtual assistant device, a computing system within an automobile, or other computing device. In some instances, agent 100 can be distributed over several computing devices, such as for example on a client device and on a server in communication with the client device over a network, wherein the network may include one or more of the Internet, an intranet, a wireless network, a Wi-Fi network, a cellular network, a LAN, WAN, private network, public network, a combination of these networks, or other network(s) suitable for communicating information. Agent 100 may also be in communication with one or more databases and/or datastores, network services that can be queried by agent 100, such as a network airline reservation service or network weather information service, which can respond to requests for information generated and transmitted by agent 100.

This disclosure focuses on the use of grammars and syntax-directed semantics. A parser results from the combination of a parsing algorithm and a grammar. Parsing is the activity of the parser module, using the parsing algorithm and the grammar. A semantic parser results from the combination of a semantic parsing algorithm and a semantic grammar. A semantic grammar consists of a grammar backbone (such as a context-free grammar) that is augmented by semantic functions. Typically, each grammar rule has an associated semantic function. Different types of semantic grammar formalisms are known in the field, with corresponding semantic parsing algorithms. In some instances, both the grammar and the semantics are expressed by a set of NLU procedures (NLU code) that handles the semantic parsing, without the need for an algorithm separate from the grammar. In some such instances, the object code is the result of optimizing a source semantic grammar. The disclosed methods are not sensitive to the details of semantic grammar formalisms and algorithms, or their expression, or optimization. They can be easily adapted to each particular setting.

Figure 2:
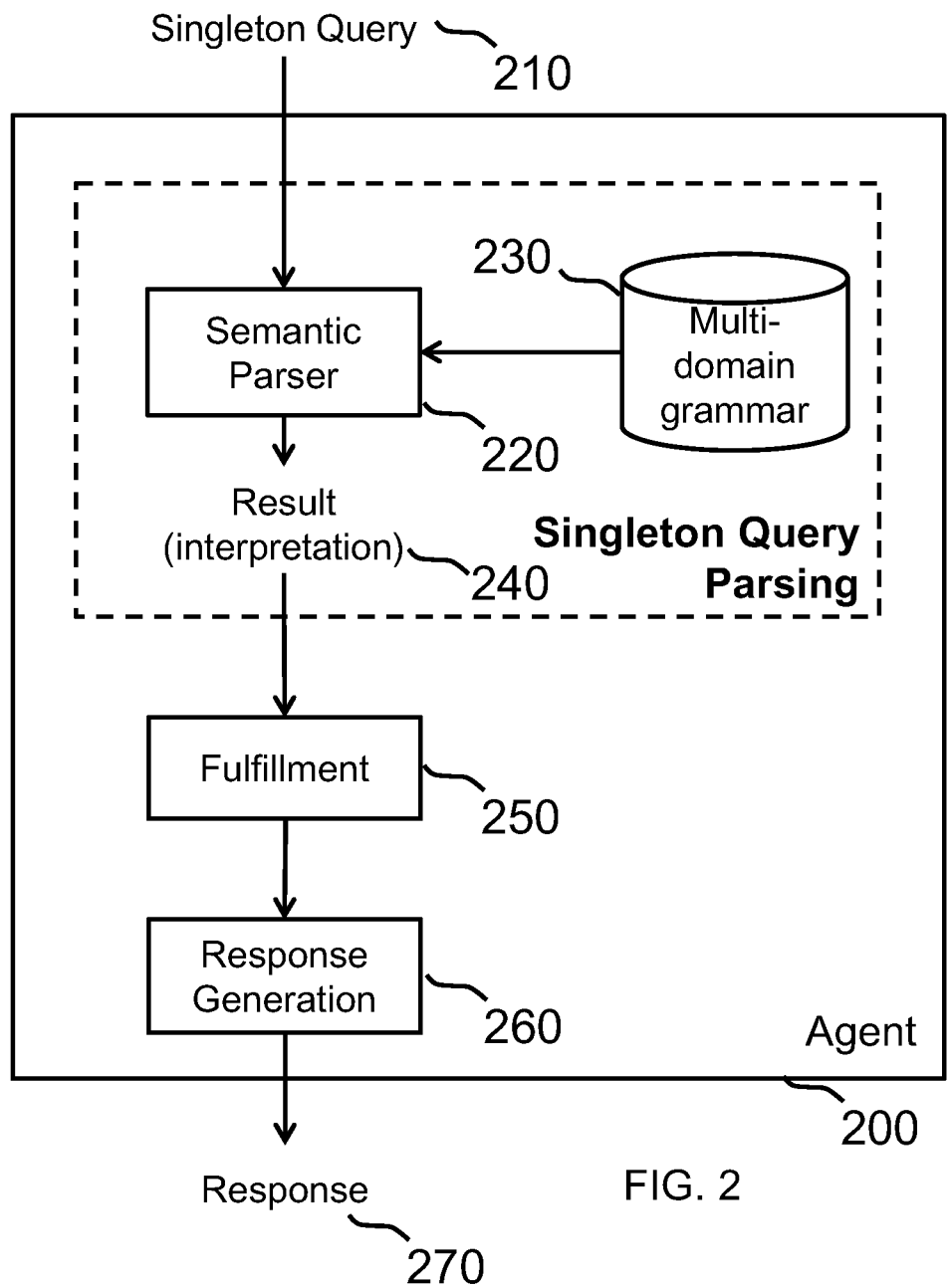
FIG. 2 shows an exemplary semantic parser for singleton natural language queries in one or more domains.

FIG. 2 shows an agent 200 having a semantic parser with its semantic grammar 230. In this situation, the grammar can be used to parse singleton queries 220, that is, queries that do not contain conjunctions at the top level, and can be used to parse queries from one or more domains.

Figure 3:
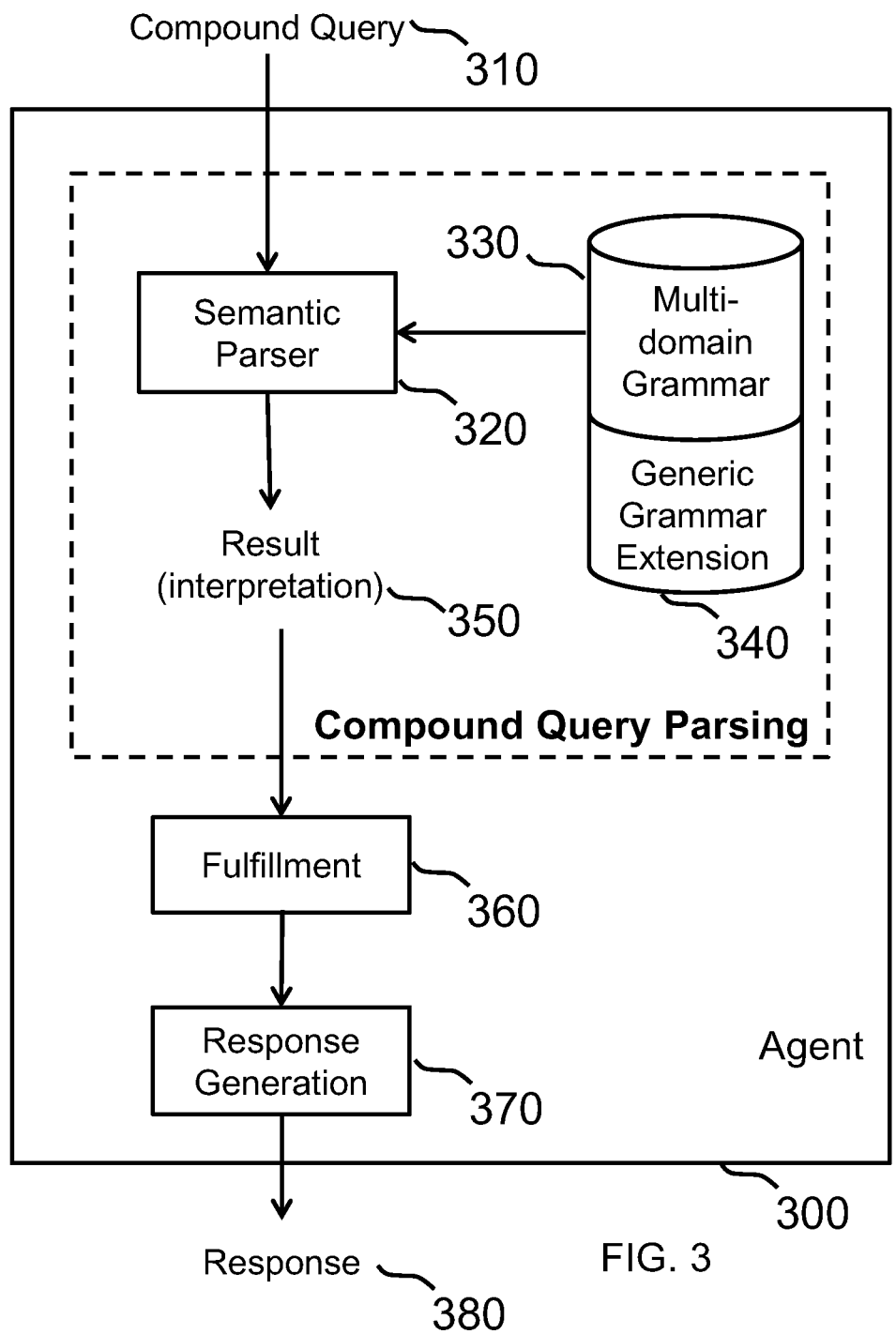
FIG. 3 shows an exemplary semantic parser for compound natural language queries.

FIG. 3 shows an agent 300 (i.e., an NLU system) that, in addition to handling singleton queries, as in FIG. 2, is able to parse and interpret compound natural language queries 320 over the same set of domains as FIG. 2. The grammar used by the semantic parser 320 includes multi domain grammar 330 and generic grammar 340. The joint grammar 330-340 is a result of adding to the rules of a multi-domain grammar 330, such as that shown in FIG. 2 as multi-domain grammar 230, a set of domain-independent grammar rules, Generic Grammar Extension 340, that provide syntax and semantics to support compound queries. Using the expanded grammar of FIG. 3, the semantic parsing algorithm will be able to recognize the queries recognized by the multi-domain grammar of FIG. 2, as well as all compound queries based on any of the formerly recognized queries.

In FIG. 3, the compound interpretation 350 output by the semantic parser contains, for each sub-query, at least an interpretation that expresses the sub-query's meaning, and perhaps substantially more information. Naturally, the result output from a compound query with N sub-queries will be a compound result, consisting of a sequence of N results. The fulfillment of the compound query will amount to fulfilling each interpretation in order. A compound response thus includes answering questions, and/or performing actions, in the precise order of the compound query.

Dialog context can include the contents of the prior conversation. Context information can be propagated and updated during semantic parsing to gather the correct data at each point for understanding a query correctly.

Figure 4:
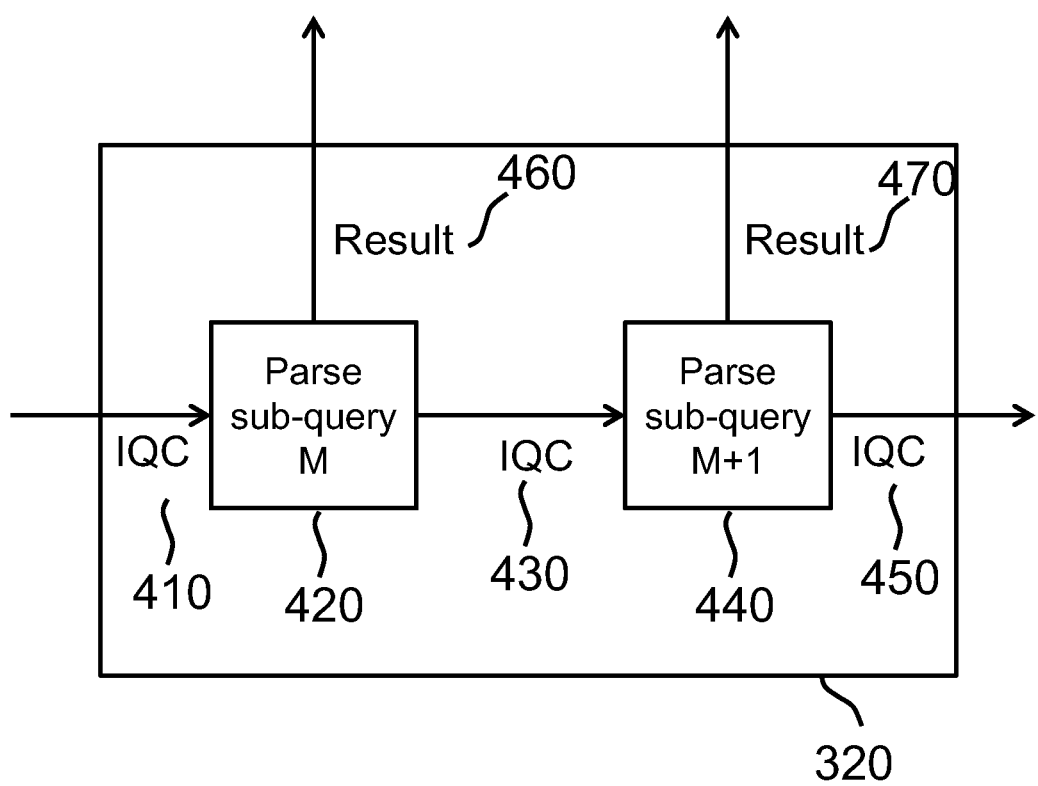
FIG. 4 shows two exemplary adjacent singleton sub-queries of a compound query during parsing.

FIG. 4 shows two adjacent sub-queries in a compound query, as they appear during semantic parsing. During the parsing of a compound query by parser 320, context information will propagate from left to right from one sub-query to the next, matching the normal way natural language text is interpreted. The output of parsing a sub-query comprises at least a sub-query result, and context information represented by an IQC. In some instances, the result and data are bundled into a single output data structure that can be split later. In the reference instance of FIG. 4, the result list and the data are shown as separate outputs of the sub-query parsing. Each sub-query receives an IQC record, called the incoming IQC, and outputs a new IQC record, called the outgoing IQC, which is an updated version of the incoming IQC. This is called propagating the data.

With reference to FIG. 4, parse sub-query M receives incoming ICQ 410, provides result 460 and outputs IQC 430. Parse sub-query M+1 receives IQC 430 as an incoming IQC, outputs results 470, and then outputs IQC 450. Hence, an output IQC of one sub-query can be the incoming IQC for another sub-query.

It should be noted that any number of sub-queries can be part of a compound query. Though two sub-queries are illustrated in FIG. 4, more can be implemented within a parser.

Figure 5:
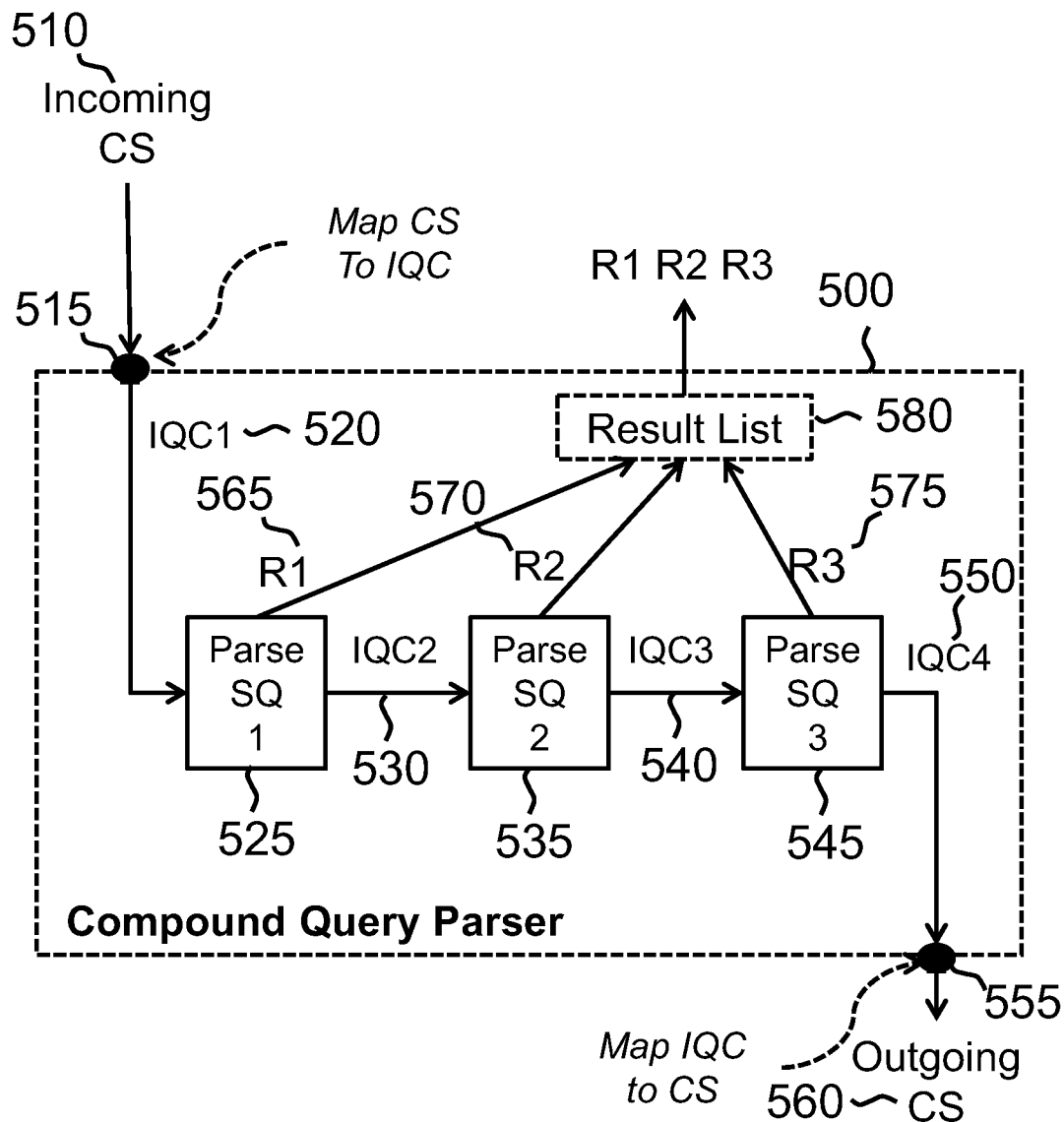
FIG. 5 shows the parsing of an example of a compound query with three sub-queries.

FIG. 5 shows an example of parsing a composite query having three sub-queries, SQ 1, SQ 2, SQ 3, each of which is recognized by the multi-domain grammar of FIG. 2. The domain-independent level of parsing is done by a Compound Query Parser, which is no more than the normal parsing algorithm executing the generic (domain-independent) grammar add-on of FIG. 3. Note that FIG. 5 is based on a top-down parser for compound queries. A generic grammar for compound queries is discussed in more detail below.

In the compound query parser 500 of FIG. 5, incoming CS 510 is mapped to IQC form at mapping 515, and the resulting IQC 520 is received as incoming IQC1 by parse sub-query 525. Parse sub-query 525 generates results 565 and provides an outgoing EQC 530, which is received as incoming IQC by parse sub-query 535. Parse sub-query 535 generates results 570 and outputs IQC 540. Parse sub-query receives incoming IQC 540, generates results 575, and outputs IQC 550. Mapping 555 receives IQC 550, maps it into CS 560, and outputs the CS 560 from parser 500.

As shown in FIG. 5, compound command conjunctions (joiner words such as and or then or also are ignored, because although joiners have an important syntactic role, they have no semantic effect that would modify the behavior of FIG. 5.

In the instance of FIG. 5, the results of parsing the three sub-queries are collected in a result list 580, which is returned by the compound query parser 500. In an "eager" instance, individual sub-query results (interpretations) are sent along as soon as they are available, and fulfilled immediately. Fulfillment module 360 of FIG. 3 accepts a stream of interpretations. In an alternative ("batch") instance, a list of results 580 is built one step at a time, and then output once to be fulfilled.

As shown in FIG. 5, the incoming CS is converted or mapped 515 to an incoming IQC (such as IQC 520 in the figure) before a recursive call is made to parse a sub-query (Parse sub-query 525), and the final IQC 550 is converted or mapped by mapping module 555 to an outgoing CS 560 that is returned to the calling function. The outgoing data of a query (compound or not) is the incoming CS for the subsequent query. Such mappings as 515 and 555 are required when a distinction is made between CS and IQC data structures. When mapping CS to IQC data, the resulting IQC typically includes all the information present in the CS data, although the format may differ. Generally, an IQC may contain query context data not present in the CS data. The mapping 555 from IQC data to CS data usually selects only a subset of the information, and the format may change.

In another instance, provided that the CS and IQC share a type definition, the behavior of FIG. 5 can be achieved without the initial and final mappings.

Generic Grammar Extension Syntax

Every domain has its own sub-grammar, with a single top-level query; if not, simple grammar editing can introduce a new single top-level query per domain. The multi-domain grammar of FIG. 2 recognizes the top-level queries of a number N of domains.

The grammar notation used here is extended BNF (EBNF). The start symbol of the joint grammar of FIG. 2 may be called <TL_QUERY>. It has a top-level rule for each of the N domains:

<TL_QUERY>→<DOMAIN_1_TL_QUERY>
    <TL_QUERY>→<DOMAIN_2_TL_QUERY>
    . . .
    <TL_QUERY>→<DOMAIN_N_TL_QUERY>

Based on such a multi-domain grammar with start symbol <TL_QUERY>, one looks for a possible generic grammar extension such as that mentioned in FIG. 3. Several possible instances exist for the generic grammar extension. This is intended for semantic parsing; both syntax and semantics will be considered in turn. The grammar must support a left-to-right ordering for the propagation of results and context information. There are two reasons for this. First, during co-reference resolution, pronouns or other unresolved references are resolved by finding a referent in the preceding text; this is facilitated by left-to-right parsing and interpretation. By default, a pronoun resolves to the most recently mentioned entity that is a good match in terms of syntax and semantics. In some instances, matching entities are found in the context data, which is the IQC data. The context data can be built and updated from left to right—without that, difficulties occur, and extra passes over the input may be needed. A second reason, which reinforces the first, is that the methods disclosed should apply to incremental parsing.

Regarding syntax, the grammar add-on of FIG. 3 may be based on the start grammar symbol <COMP_QUERY>. As discussed, the rules for <COMP_QUERY> must support a left-to-right propagation of results and data. Typical conjunctions found in a compound query include the word and and several alternatives. A set of conjunctive words or phrases may be defined using a grammar symbol <JOINER>. Here is a possible sample English syntax for <JOINER>:

<JOINER>→"and"|"then"|"also"|"and also"|"then also"

Three instances of the compound query syntax add-on will now be considered. In a "right-recursive" instance, the production rules for <COMP_QUERY> are:

<COMP_QUERY>→<TL_QUERY>
    <COMP_QUERY>→<TL_QUERY><JOINER>
        <COMP_QUERY>

This set of rules handles a compound query like Q1 and Q2 and Q3 and Q4 by generating a parse tree with the structure (Q1 and (Q2 and (Q3 and (Q4))), which seems to suggest a right-to-left computing order, according to traditional bottom-up semantics. But the semantic information propagation associated with a right-recursive grammar can most easily propagate semantic information towards the left, which is not preferred.

In a "left-recursive" instance, production rules for <COMP_QUERY> can be:

<COMP_QUERY>→<TL_QUERY>
    <COMP_QUERY>→<COMP_QUERY><JOINER>
        <TL_QUERY>

This instance easily propagates information from left to right. It handles a compound query Q1 and Q2 and Q3 and Q4 by generating a parse tree with the structure (((Q1) and Q2) and Q3) and Q4, which implies the desired left-to-right ordering. However, a left recursive grammar can be problematic for certain parsing algorithms.

In some instances, recursion is not necessary, as it is easy to proceed iteratively. In a "regular expression" instance, a single production rule is sufficient to describe the syntax:

<COMP_QUERY>→<TL_QUERY>
    (<JOINER><TL_QUERY>)*

Here, (E)* stands for the repetition of zero or more instances of E, as it does as in standard regular expressions (the Kleene operator). A parser for such a repetition can be implemented in every type of parser.

Generic Grammar Extension Semantics

Figure 6:
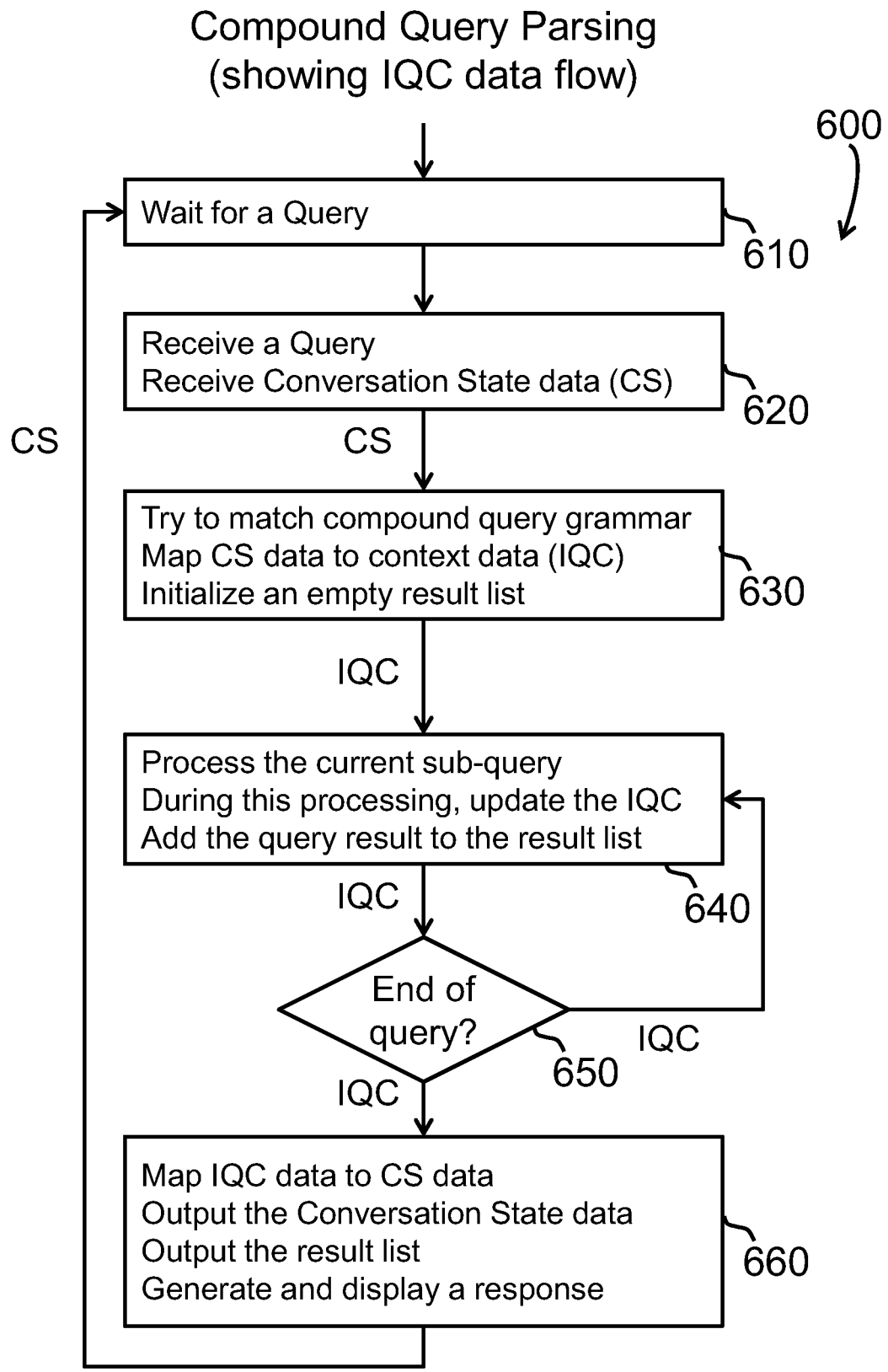
FIG. 6 shows a flowchart of an exemplary semantic parsing algorithm for compound query processing, with emphasis on CS and IQC data flow.

FIG. 6 illustrates a method for processing a compound query. A semantic parser waits a query input at step 610. The initialization step is executed when starting to parse the <COMP_QUERY> grammar symbol, and before starting to parse the first sub-query. The semantic parser receives a query and CS input at step 620. An attempt is made to match the compound query grammar to received input, and the CS input can be mapped to an IQC data structure at step 630. An empty result list can also be initialized at step 630.

An IQC is output as a result of step 630, and the method of FIG. 6 begins an iterative flow. at step 640, the innermost iterative step in FIG. 6, receives an incoming data instance (the initial one, or a subsequent one) and parses a sub-query according to the <TL_QUERY> grammar at step 640. The context information (IQC) is also updated at step 640. The iterative step is executed once per sub-query (including the case of a singleton query).

A sub-query is processed recursively. The sub-query parser receives an incoming ICS as input; updates the ICS during the processing, and adds the query result to the result list at step 640. The outgoing IQC is derived from the incoming conversation state by performing all of the updates that the sub-query requires in the course of parsing. If there is another sub-query at step 650, the outgoing IQC of one sub-query will be the incoming ICS of the next sub-query and the method returns to step 640. Otherwise, at step 660 the final ICS will be converted or mapped to a CS, the conversion state data is output, the result list is output, and a response is generated and displayed. The CS is preserved for later use, for example when the next query comes along.

Typical updates to context information include adding slot-value pairs, or simultaneous groups thereof, adding time-stamps for groups, and removing old information that is either too old or made obsolete by new information as it appears in the course of the current parse. In some embodiments, it is determined in a domain-dependent manner, in the course of the parsing of the current query.

The grammar symbols above have no associated semantics, and the algorithm described above is not specified in terms of the relevant semantic grammar. In an instance, semantics are associated with grammar symbols using semantic functions that take semantic values as input, and return semantic values as outputs. Every symbol has an associated semantic function.

For the grammar symbols of interest, both incoming and outgoing semantic values for semantic functions are instances of the data structure. Accordingly, the semantic functions associated with the symbols in use have the following types:

data outgoing_data=COMP_QUERY(incoming_data)
    data outgoing_data=TL_QUERY(incoming_data)
    data outgoing_data=DOMAIN_1_TL_QUERY (incoming_data)
    . . .
    data outgoing_data=DOMAIN_J_TL_QUERY (incoming_data)
    . . .
    data outgoing_data=DOMAIN_N_TL_QUERY (incoming_data)

The following describes a simple instance of data propagation. When parsing involves the singleton rule <TL_QUERY>→<DOMAIN_J_TL_QUERY>, the outgoing data of <TL_QUERY> is the outgoing data of <DOMAIN_J_TL_QUERY>, given the same incoming data. Thus, the value returned by TL_QUERY(x) is that returned by DOMAIN_J_TL_QUERY(x) Similarly, the semantics of a singleton query, associated with the singleton rule <COMP_QUERY>→<TL_QUERY> are inherited from those of <TL_QUERY>, i.e., COMP_QUERY(x)=TL_QUERY(x).

Consider a rule of the form <A>→<B><C>. In a simple instance of semantic propagation, the semantics of symbol <A> are derived from those of symbols <B> and <C> by functional composition. That is, if <A>, <B> and <C> have associated semantic functions A, B and C, then $A(x)=C(B(x))$. The same would apply to a rule of the form <A>→<B><C><D>, with the result that $A(x)=D(C(B(x)))$. Also note that the <JOINER> symbol has pass-through semantics, meaning that JOINER(x)=x.

Use of a function call notation, such as $A(x)=D(C(B(x)))$ is natural in some programming environments. However, equivalent computations can be implemented by a sequence of statements such as {b=B(x); c=C(b); d=D(c); return d;}

Based on all the above, the semantic function defined by a natural language compound query of the form Q1 and Q2 and . . . and QN where the sub-queries are top-level queries, is outgoing_data=SN( . . . (S2(S1(incoming_data))) . . . ) in functional form, or an equivalent sequential form as described in the previous paragraph.

Finally, the incoming CS of a query is the outgoing CS of the previous query, and the incoming result list is empty.

Figure 7:
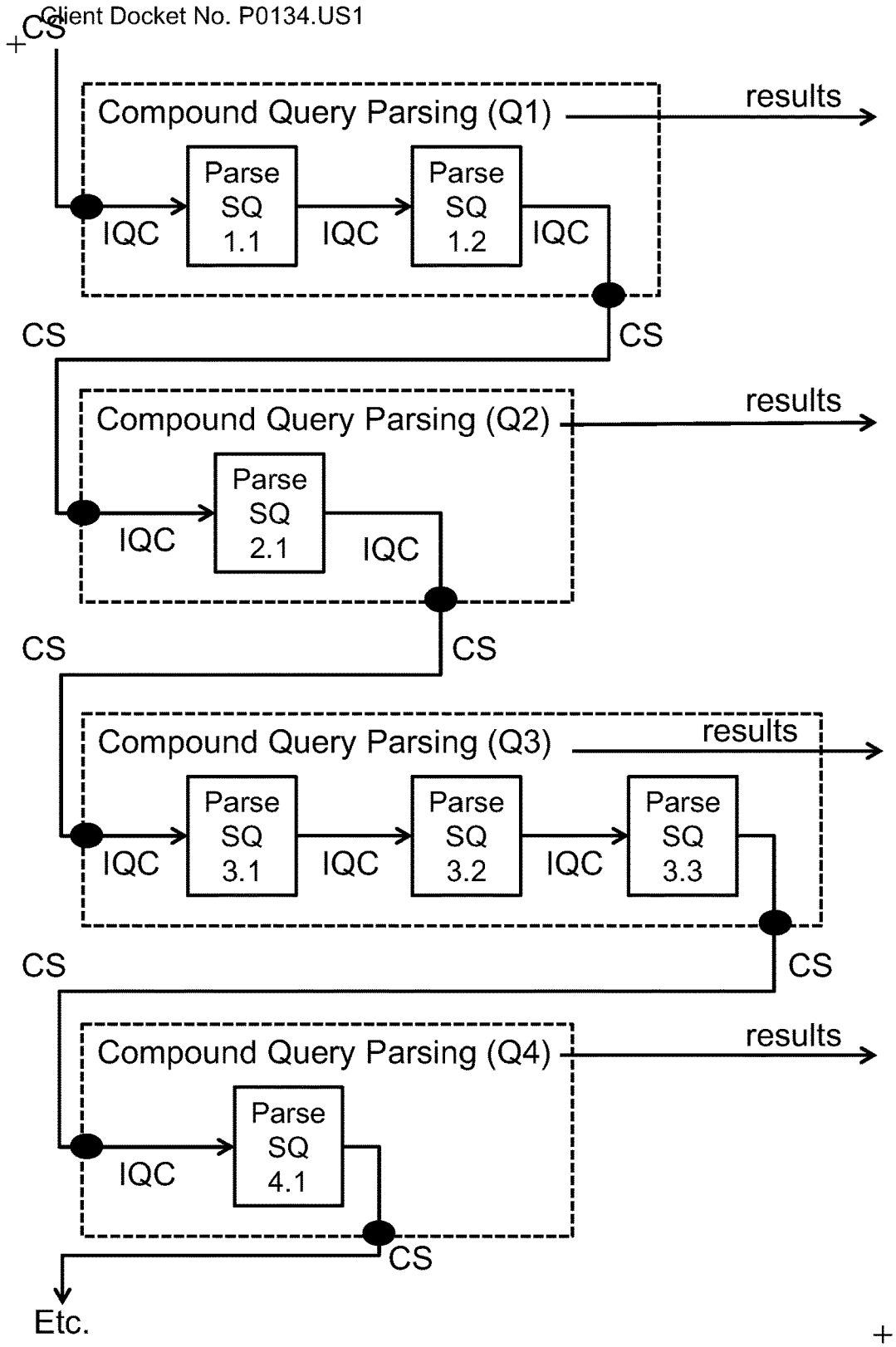
FIG. 7 shows an example of the flow of CS and IQC during a four-query dialog.

FIG. 7 shows an example of the flow of conversation state data during a four-query dialog. Query 1 has two sub-queries, 1.1 and 1.2. Query 2 is not truly a compound query, but in this framework, <COMP_QUERY> is the top grammar symbol, so query 2 must appear as compound query with one sub-query, 2.1. Query 3 has three sub-queries, 3.1, 3.2 and 3.3. And query 4, just like query 2, is treated as a compound query with one sub-query, 4.1.

Figure 8A:
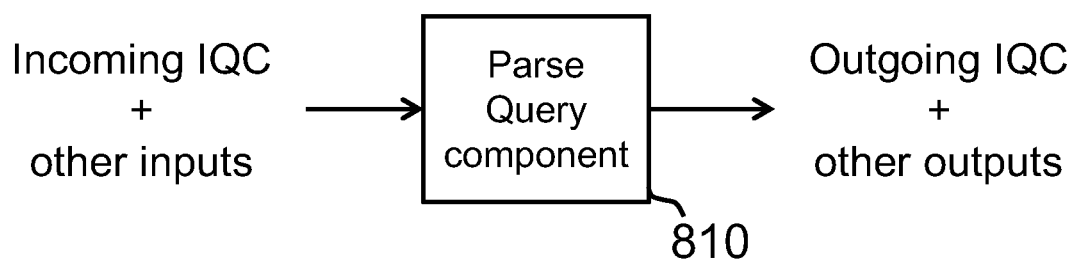
FIGS. 8a and 8b shows the inputs and outputs of an exemplary query component during parsing, including the incoming and outgoing IQC.
Figure 8B:
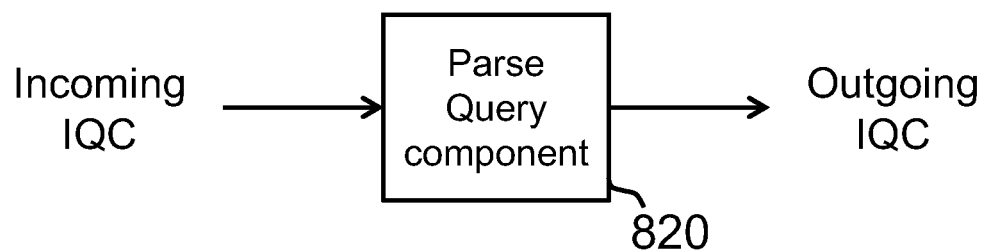

FIGS. 8a and 8b shows the inputs and outputs of a query component including its incoming and outgoing state, in an instance where the component is expressed as a parsing function. Every such component is associated with a grammar symbol C, and has an associated function Parse_C in a recursive descent parser. The component's function (Parse_C) handles parsing and syntax-directed interpretation. Note that the technology disclosed herein is not limited to recursive descent parsers.

FIG. 8a shows all the inputs and outputs of the parse of a query component 810. It takes as inputs an incoming IQC and optionally other inputs. It produces as outputs an outgoing IQC and optionally other outputs. FIG. 8b shows a simplified view, focused on IQC propagation alone, ignoring optional inputs and outputs. The parse query component 820 and its associated function Parse_C have a single input and a single output, which are IQC data. Optional arguments, if present, are simply not shown. The use of the figure can be expressed mathematically, or in a computer program such as a recursive descent parser, by the statement:

outgoing IQC=Parse_C(incoming IQC)

Figure 9:
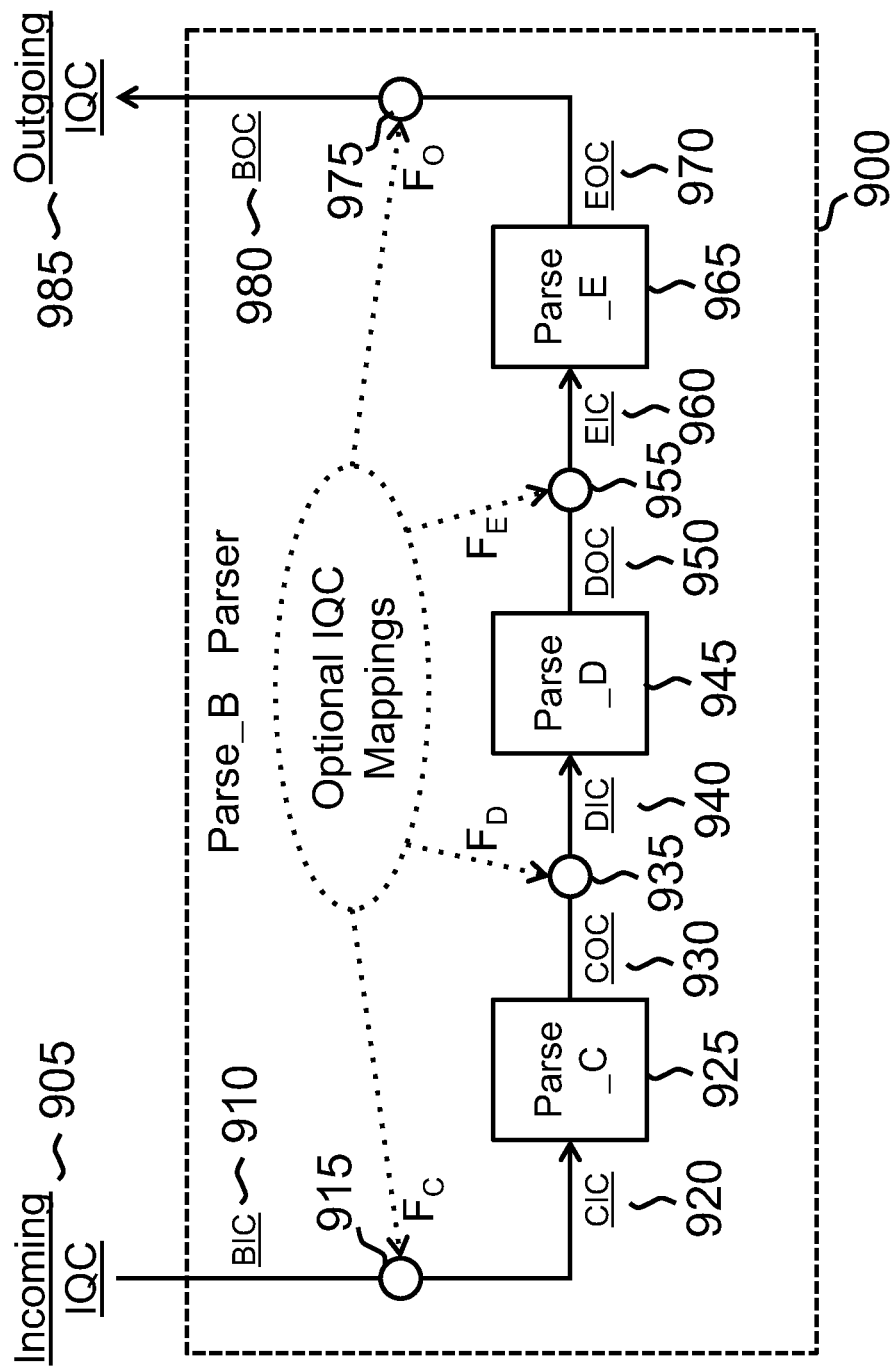
FIG. 9 shows an exemplary IQC data flow during semantic parsing of an example syntax rule.

FIG. 9 illustrates the IQC data flow during semantic parsing by a parser 900. Parser 900 uses an example syntax rule, B→C D E. The graphical notation is that of FIG. 8b. The function Parse_B for parser 900 has an incoming IQC 905 and an outgoing IQC 985. The parser invokes recursively the functions Parse_C 925, Parse_D 945, and Parse_E 965, passing in an incoming IQC and receiving an outgoing IQC from each of them.

As illustrated in FIG. 9, an incoming IQC 905 is received by parser 900. The incoming IQC 905 is the B parser incoming context for the B parser (BIC 901). Incoming IQC is received and can be modified by mapping 915. The output of mapping 915 is the input IQC—C parser incoming context (CIC) 920—to parse C 925. Parse C parses the incoming CIC and outputs an IQC (C outgoing context 930) to mapping 935. Mapping 935 can modify the IQC, and outputs DIC 940 to parse D 945. Parse D receives and parses DIC 940 of mapping 935 as an incoming context, and outputs an output context DOC 950 to mapping 955. Mapping 955 can modify the context, and outputs EIC 960 to parse E 965. Parse E parses the received context and outputs EOC 970 to mapping 975, which optionally modifies the output context and provides outgoing IQC 985.

Each of mappings 925, 935, 955, and 975 may be implemented as a module stored in memory and executed by one or more processors to modify context data, and perform other functionality as discussed herein. In some instances, the mapping simply amounts to an operation to an IQC data structure, such as adding, deleting or replacing a context association such as a variable-value pair or an Object-Attribute-Value triple. In some instances, data structures may be copied before or as part of the modification. In some other instances, the data structures that represent context are modified in place.

In some instances, the function Parse_B can use every opportunity to modify the IQC while propagated across the parse modules 925-965, using IQC to IQC mappings $F_C$ 915, $F_D$ 935, $F_E$ 955, and $F_O$ 975 (before Outgoing). But all of these mappings are optional, and they often amount to the identity function, which returns or outputs the same IQC as was received by the mapping.

Each rule in a context-free grammar (in BNF notation) has a form similar to the one used by FIG. 9, B→C D E, where the left-hand side (LHS) is B and the right-hand side (RHS) symbols are C, D and E. In some instances, some symbols in the RHS may be terminal. The presence of terminals presents no special difficulty in the framework. For example, if symbol D is terminal, its parsing requires no recursive call, but a match of the terminal string D against the query input text. In that case, the mapping $F_E$ 955 permits the updating of the IQC following the traversal of the terminal D in the rule B→C D E.

IQC mappings such those in FIG. 9 can be used to modify an IQC data structure. The modification by such mappings may include but are not limited to (a) to add associations, such as key-value pairs, object-attribute values, logic clauses, or other forms of context representation; (b) to replace such associations when new ones override previous ones; (c) to delete associations when they become obsolete, either following a replacement, or due to the passage of time (according to thresholds based on clock time elapsed, or number of turns since the creation of the association). In some instances, the modifications can include giving weights to certain aspects of content in the IQC. Associations within an IQC are given a weight or strength. The weight may have an effect on the retrieval of context information, especially when multiple values compete for attention. In some instances, weak associations may be forgotten sooner than strong ones. Mapping units may adjust, add, or remove weightings for associations within an IQC.

The mappings that are propagated through all parsing functions can be used by such functions whenever needed. Frequently occurring cases involve anaphora resolution, or co-reference resolution. For example, in the query what is the weather there, the word there refers to a recently mentioned location, other than the current location, and the IQC could be looked up to find it and supply it to the weather query. For a more complex example, where there is no pronoun, consider the query Do you have a red eye, and can I fly tomorrow. The incoming IQC for Do you have a red eye will be examined to see if any flight information was being discussed, such as having a departure city and/or a destination, and an update would add the red eye information (presumably this is a West coast to East coast flight) to its outgoing IQC. Next, the incoming IQC for can I fly tomorrow can take the various constraints into account. In that sense, the IQC acts as a place to keep track of currently relevant constraints.

One aspect of the present technology is that it does not have to wait until the end of a natural language query to parse its content and use its context. Rather, parsing can be performed incrementally, and in the case of a live interactive system, it can be continuously performed in real time. In an incremental implementation, multiple parsing hypotheses are generated and updated in parallel by the parser. As new text input appears, parsing hypotheses may split into multiple hypotheses, while other parsing hypotheses die out and can be removed. In some incremental implementations, each partial parse hypothesis receives a score, and only the best N hypotheses are kept for future processing. This is called beam search. The methods disclosed are suitable for use in incremental parsing, including beam search, but they are also applicable to other left-to-right parsers.

FIG. 10 shows exemplary program code that implements the semantic parsing and data flow of FIG. 9. The recursive function Parse_B behaves exactly as shown. Note that the IQC to IQC mappings $F_C$ 915, $F_D$ 935, $F_E$ 955 and $F_O$ 975 are implemented by update functions B_to_C, B_to_D, B_to_E, and B_Out. These functions are declared in the code of FIG. 10, but not implemented, because they depend on both the LHS of the rule, B, and the RHS of the rule, C, D or E (and O is treated as an end-marker at the end of the rule. In that sense, FIG. 10 is not a complete implementation, but it serves as a template, or framework, for defining the NLU code and the manner in which it propagates intra-query context.

Figure 11:
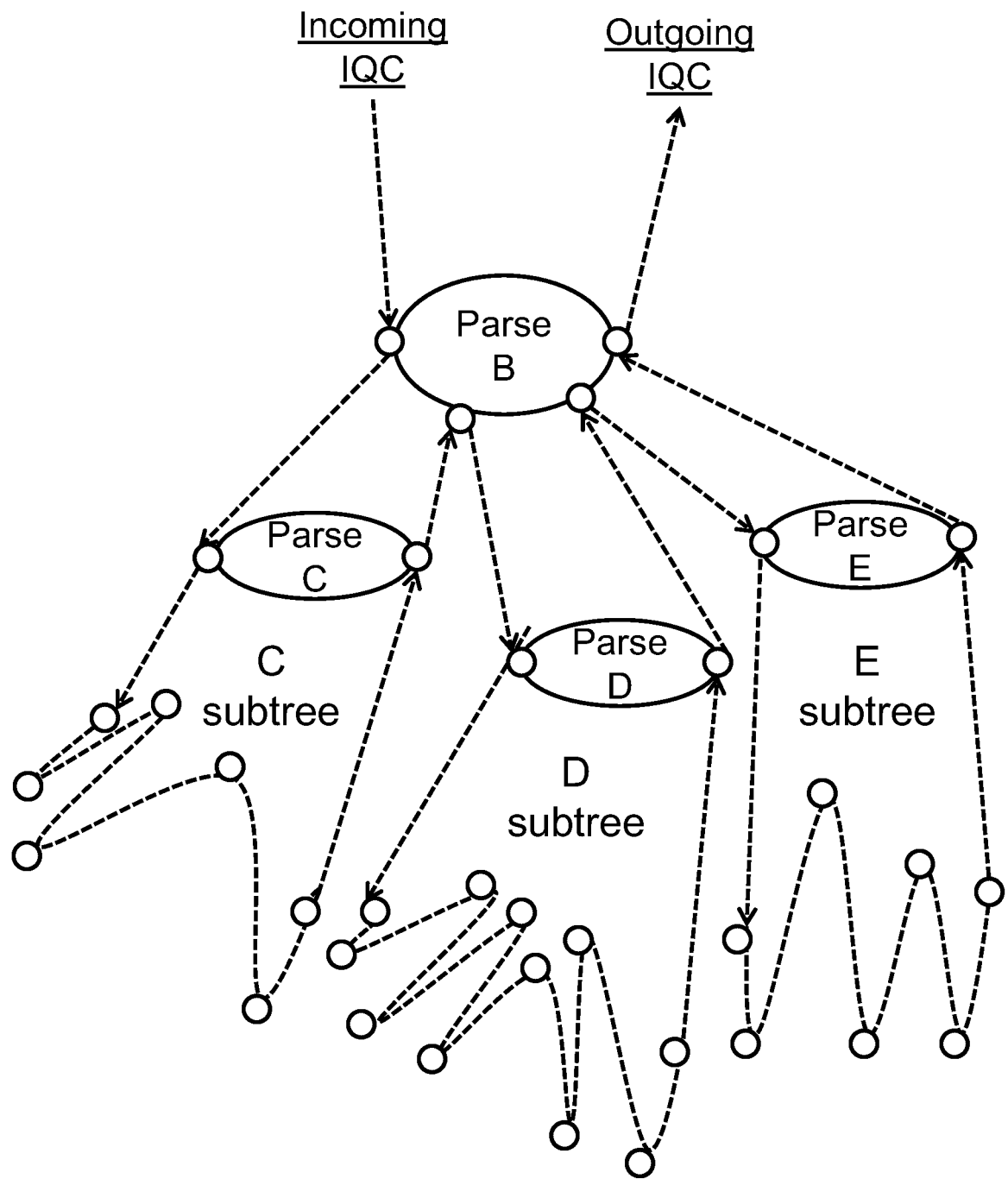
FIG. 11 shows an exemplary recursive traversal of a parse tree during semantic parsing of the example from FIG. 9.

FIG. 11 shows the traversal of a parse tree during the semantic parsing in FIG. 9. The framework described so far exploits on a recursive tree traversal, that FIG. 11 illustrates by pointing to the traversal of subtrees C, D, and E. Each symbol (or node or component parse function) has an incoming and an outgoing mapping (illustrated by small circles to the left and the right of the symbol) and possibly more mappings on the inside; for example, symbol B has two more mappings, and symbols C, D and E have several more mappings in their subtree—whose location is not shown in a precise way. The traversal walks around the parse tree, sweeping its outer boundary, and the sequence of terminals at the bottom of the parse tree are the text of the query being parsed. It is important to note that although this technique has been described as a recursive top-down left-to right traversal, it is also fully compatible with top-down incremental parsing. This means, first, that syntax, semantics and context propagate from left to right; second, that with an online implementation of incremental parsing, one in which the parser only advances one terminal symbol at a time, some sharing of context updates occur; third, that when the algorithm maintains as many parse trees in parallel as are still feasible (the parallel set possibly trimmed by a beam search) the IQCs also progress in parallel, in a "just in time" or "real time" basis. For example, as the C subtree completes, the outgoing IQC for symbol C may be computed before the presence of D and E is established. If it turns out that the rule B→C F was going to match the input, not B→C D E, the computation of the outgoing IQC for symbol C will be shared, and no context updates will be either missed or computed redundantly.

Figure 12:
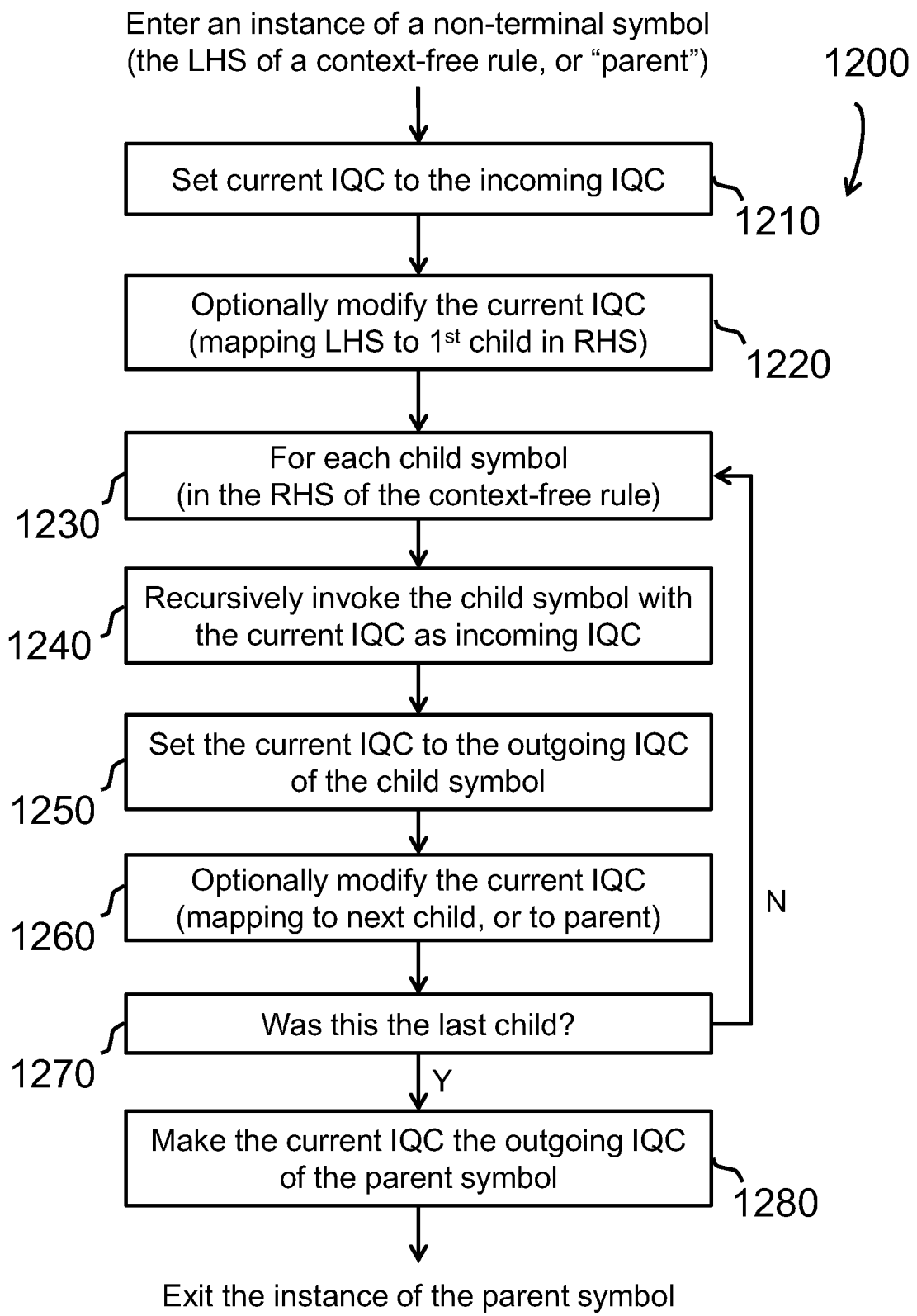
FIG. 12 shows a flowchart for exemplary semantic parsing and data maintenance of a context free grammar rule, such as exemplified in FIG. 9.

FIG. 12 shows a flowchart for the semantic parsing and data maintenance of a context free grammar rule, such as exemplified in FIG. 9 for the rule B→C D E, in a recursive descent instance. The implementation in a top-down incremental parser is more complex than this, but the theory and practice of incremental parsing are well known in the art. As far as context propagation is concerned, the computation follows the same lines as a recursive descent parser. While FIG. 10 shows is an example of specific code for the rule B→C D E, the flowchart of FIG. 12 addresses the general case of a context-free rule in BNF.

The method of FIG. 12 begins with setting a current IQC to the incoming IQC at step 1210. In some instances, this is a logical step and no transformation or processing is done to the current IQC. The incoming IQC is received by a mapping (e.g., 915 of FIG. 9) and is optionally modified at step 1220. This mapping converts the incoming context data for the LHS of a rule to the incoming context data for the first child in the RHS of the rule. As mentioned earlier, modifications may include adding context associations, replacing associations, deleting associations, or performing other modifications of the IQC.

According to step 1230, the algorithm performs a left-to-right iteration over the children of the parent (LHS) symbol, which are the RHS symbols. Steps 1240-1270 are performed for each child symbol in left-to-right order. The parser for the current child symbol is recursively invoked with the current IQC as the incoming IQC at step 1240. Upon return from the recursive call, the current IQC is set to the outgoing IQC of the child symbol at step 1250. A determination is then made at step 1260 as to whether the current child is the last child. If the current child is not the last child, the current IQC can be optionally be modified by an IQC mapping from the current child to the next child in the right-hand symbols of the present rule. If the current child is the last child, the current IQC can be optionally be modified by an IQC mapping from the last child to the parent symbol of the rule. After the current IQC has been updated by step 1260, the method returns to step 1230, if there is a next child, or to step 1280 if the most recent child was the last child. The latter steps set the outgoing IQC of the parent symbol to the current IQC, and the parser instance for the parent symbol's exits.

Figure 14:
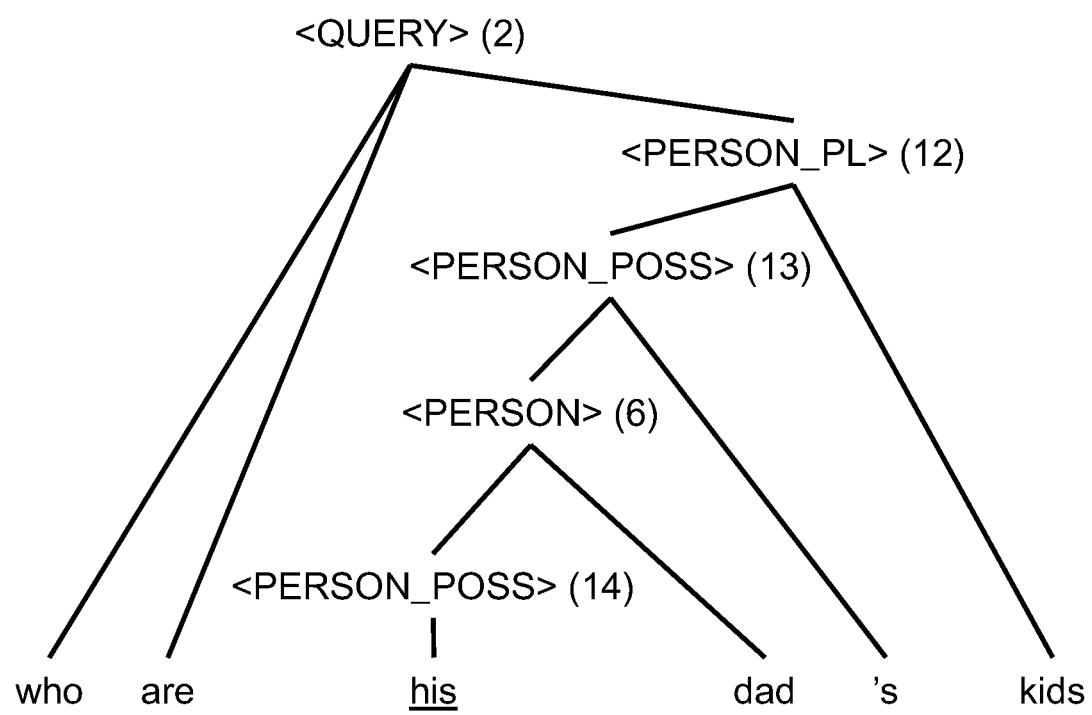
FIG. 14 shows an exemplary parse tree for the sub-query who are his Dad's kids, according to the grammar of FIG. 13.

FIGS. 13 and 14 illustrate respectively, a context-free grammar, and how parsing with the grammar also results in propagating an intra-query context. FIG. 13 shows a context-free grammar with enough rules to parse the underlined sub-query of the compound query How old is Barak Obama and who are his Dad's kids. The 15 rules in the context free grammar list RHS symbols of <QUERY>, <PERSON>, and <PERSON_POSS>. The LHS provide for two rules involving the <QUERY> symbol, namely "who is <PERSON>" and "who are <PERSON_PL>." There are seven rules with the RHS of <PERSON>, three rules with an RHS of <PERSON_PL>, and three rules with an RHS of >PERSON_POSS>.

FIG. 14 shows the parse tree for the sub-query who are his Dad's kids, according to the grammar of FIG. 13. The numbers that appear in parenthesis after the grammar symbols refer to the specific rule numbers from FIG. 13. The root node of the tree <QUERY> is formed using rule 2, with child nodes who, are, and <PERSON_PL>. From rule 12, child node <PERSON_PL> has child nodes of <PERSON_POSS> and kids. From rule 13, <PERSON_POSS> has child nodes <PERSON>, 's, and <PERSON>, based on rule 6, has child nodes <PERSON_POSS> and dad. The child node <PERSON_POSS> has child node his.

An intra-query context can be propagated to create the correct interpretation. The outgoing context from the sub-query, How old is Barak Obama, includes (among other associations) Barack Obama as the main the person entity. This context data is passed unmodified through the conjunction; hence the incoming context that reaches the root of FIG. 14 also has Barack Obama as its main person entity. Assume the <QUERY> rule (rule 2), the <PERSON_PL> rule (rule 12), and similarly rules 13, 6 and 14, all forward their unmodified incoming context to their first child (first RHS symbol). Accordingly, when the <PERSON_POSS> rule (rule 14) resolves the pronoun his, it binds it to the person entity Barak_Obama_1, who (one would assume) is the best-known person with that name.

Next, the semantics of rule 6 for <PERSON> requests a lookup (in a suitable fact database) of the father of the <PERSON_POSS> person entity, Barak_Obama_1. In some instances, the database lookup need not be performed immediately; this would be an "eager evaluation" and in some instances need not be done immediately during parsing. A pragmatic reason is that in general there are multiple parses to be considered, only some of which successfully parse the entire query, and it is inefficient to do extra work beyond parsing until a parse has been settled on.

Instead, the evaluation should generally be postponed—something called "lazy evaluation". In most instances, lazy evaluation is used, and a formula, such as perhaps lookup (Barak_Obama_1, Father) or Father(Barak_Obama_1), depending on the notation used, is retained for further processing. A context mapping within rule (6) (such as perhaps the final mapping) assigns this formula to be the main person entity in the outgoing query context of the <PERSON> (6) node, which corresponds to the query fragment his dad. Note that Barak_Obama_1 may remain a person entity in the outgoing context, but not the main person entity.

The outgoing context from his dad returned by <PERSON> (rule 6) is returned, unmodified, by <PERSON_POSS> (rule 13). The semantics of <PERSON_PL> (rule 12) apply a further formula, resulting in Children(Father(Barak_Obama_1)) becoming the main multi-person (entity list). However, Father(Barak_Obama_1) and Barak_Obama_1. Using similar steps, the top query of FIG. 12 will yield (as a result) the names of the entities in Children(Father(Barak_Obama_1)), while retaining the outgoing context.

Alternative Instances

The generic compound query grammars described so far support expressions like Q1 and Q2 and Q3 and Q4. In another instance, a modified grammar supports other natural expressions, like Q1, Q2, Q3 and Q4, where and only appears once, before the last sub-query. It is not difficult to modify the disclosed grammar to handle these more natural forms.

In an instance, users of a virtual assistant, or providers of the virtual assistant, may be charged for the execution of queries. In some such instances, accounting data may be part of the context information. This is useful when query usage is charged to an account. Usage costs can be propagated as a part of the data, and successive costs can be added up to determine the total cost of a compound query.

Grammar-driven parsers are not the only approach to query interpretation. In some instances, where the algorithm used to analyze and interpret queries is not strictly a grammar-driven parser, the methods disclosed herein may still be used. For example, the top-level query (<TL_QUERY>) recognizer may not be syntactically driven, or depend on a context-free grammar, as assumed above; or the semantic processing may not be syntax-driven. Nevertheless, the methods disclosed can be adapted to allow the parsing of a compound expression, and the propagation of conversation state data across sub-queries that are top-level queries.

Figure 15:
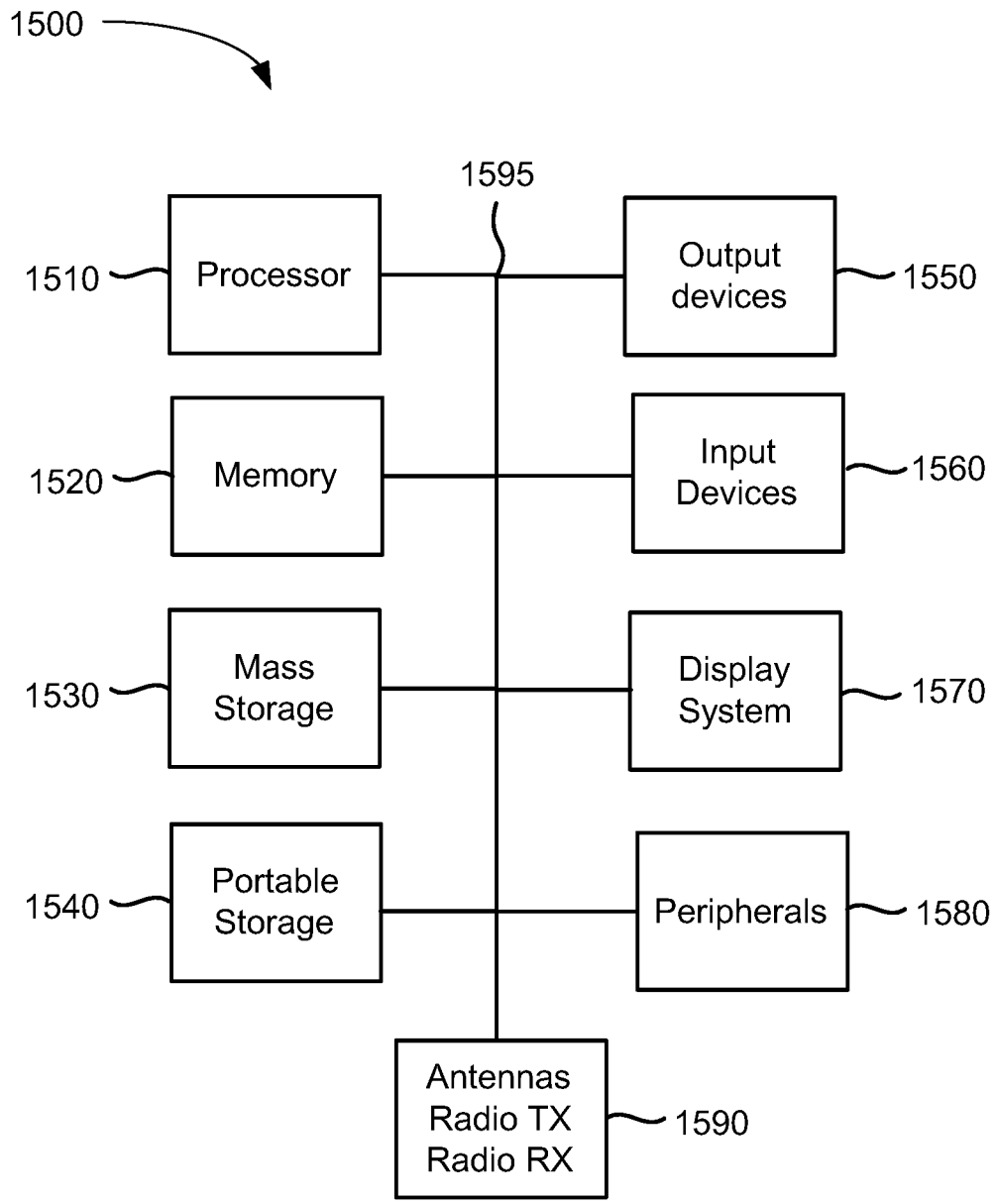
FIG. 15 illustrates an exemplary computing environment for implementing the technology described herein.

FIG. 15 is a block diagram of a system for implementing machines that implement the present technology. System 1500 of FIG. 15 may be implemented in the contexts of the likes of machines that implement computing device 105 of FIG. 1, databases such as grammar databases of FIGS. 2-3, and other machines that may be used to implement a portion of the system of the present technology. The computing system 1500 of FIG. 15 includes one or more processors 1510 and memory 1520. Main memory 1520 stores, in part, instructions and data for execution by processor 1510. Main memory 1520 can store the executable code when in operation. The system 1500 of FIG. 15 further includes a mass storage device 1530, portable storage medium drive(s) 1540, output devices 1550, user input devices 1560, a graphics display 1570, and peripheral devices 1580.

The components shown in FIG. 15 are depicted as being connected via a single bus 1590. However, the components may be connected through one or more data transport means. For example, processor unit 1510 and main memory 1520 may be connected via a local microprocessor bus, and the mass storage device 1530, peripheral device(s) 1580, portable storage device 1540, and display system 1570 may be connected via one or more input/output (I/O) buses.

Mass storage device 1530, which may be implemented with a magnetic disk drive, an optical disk drive, a flash drive, or other device, is a non-volatile storage device for storing data and instructions for use by processor unit 1510. Mass storage device 1530 can store the system software for implementing embodiments of the present invention for purposes of loading that software into main memory 1520.

Portable storage device 1540 operates in conjunction with a portable non-volatile storage medium, such as a floppy disk, compact disk or Digital video disc, USB drive, memory card or stick, or other portable or removable memory, to input and output data and code to and from the computer system 1500 of FIG. 15. The system software for implementing embodiments of the present invention may be stored on such a portable medium and input to the computer system 1500 via the portable storage device 1540.

Input devices 1560 provide a portion of a user interface. Input devices 1560 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1500 as shown in FIG. 15 includes output devices 1550. Examples of suitable output devices include speakers, printers, network interfaces, and monitors.

Display system 1570 may include a liquid crystal display (LCD) or other suitable display device. Display system 1570 receives textual and graphical information and processes the information for output to the display device. Display system 1570 may also receive input as a touch-screen.

Peripherals 1580 may include any type of computer support device to add additional functionality to the computer system. For example, peripheral device(s) 1580 may include a modem or a router, printer, and other device.

The system of 1500 may also include, in some implementations, antennas, radio transmitters and radio receivers 1590. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1500 of FIG. 15 are those typically found in computer systems that may be suitable for use with embodiments of the present invention and are intended to represent a broad category of such computer components that are well known in the art. Thus, the computer system 1500 of FIG. 15 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for processing a natural language compound query having a plurality of natural language sub-queries, the method comprising:
   receiving, by a semantic parser having a plurality of sub-query parsers executing on a computing device, incoming conversation state data for a compound query;
   creating incoming context data for a first sub-query parser from the incoming conversation state data;
   parsing each natural language sub-query in left-to-right order by the plurality of sub-query parsers, each sub-query parser associated with one of the plurality of natural language sub-queries, whereby the semantic parser and the sub-query parsers are top-down parsers, wherein each sub-query parser operates to:
      receiving the incoming context data as input for parsing the sub-query by the sub-query parser;
      computing, by the sub-query parser as an output of parsing the sub-query, outgoing context data for the sub-query; and
      providing the outgoing context data as incoming context data for a next sub-query; and
   extracting outgoing conversation state data of the compound query from the outgoing context data provided by a last sub-query parser of the plurality of sub-query parsers.

2. The method of claim 1, wherein the parser includes a fixed high-level cross-domain grammar to process compound queries from one or more domains.

3. The method of claim 2, wherein the fixed cross-domain grammar defines a set of cross-domain joiner words used as separators between sub-queries.

4. The method of claim 1, where each of the incoming conversation state data and the outgoing conversation state data include one or more variable-value pairs.

5. The method of claim 4, where the one or more variable value pairs are subject to lazy evaluation.

6. The method of claim 1, where each of the incoming conversation state data and outgoing conversation state data include a collection of attribute-object-value triples.

7. The method of claim 6, where attribute-object-value triples are subject to lazy evaluation.

8. The method of claim 1, where each of the incoming conversation state data and outgoing conversation state data include one or more logic formulas.

9. The method of claim 8, where the one or more logic formulas are subject to lazy evaluation.

10. The method of claim 1, where parsing a sub-query includes performing anaphora resolution or co-reference resolution using the sub-query's incoming context data.

11. The method of claim 1, further comprising:
   generating a result list for the compound query by semantic parser, wherein the parsing of each sub-query includes computing a result, the results of successive sub-queries being concatenated in the context data to create a result list for the compound query.

12. The method of claim 1, wherein computing the outgoing context data for the sub-query is performed as if the sub-query were a top-level query.

13. The method of claim 1, the method further comprising:
   processing an internal parse state of one or more query components according to a context-free semantic grammar,
   wherein each query component has incoming context data and outgoing context data;
   receiving incoming conversation state data for the compound query;
   creating incoming context data for the first sub-query, comprising at least the incoming conversation state data;
   while parsing each natural language sub-query in left-to-right order:
      receiving incoming context data for the sub-query;
      using the incoming context data as input for the parsing;
      computing, as an output of parsing the sub-query, outgoing context data for the sub-query; and
      using the outgoing context data as incoming context data for the next sub-query; and
   deriving the outgoing conversation state of the compound query from the outgoing context data of last sub-query.

14. The method of claim 1, wherein the semantic parser is incremental.

15. A method of propagating context data in a top-down semantic parser according to a context-free grammar, the grammar having a rule that includes a left hand side (LHS) symbol and a list of symbols on a right hand side (RHS), the method comprising:
   mapping, by a first mapping module executing on a computing device, the LHS symbol's incoming context to an incoming context for a first RHS symbol in the list of RHS symbols;
   parsing, by a first parser executing on a computing device, the first RHS symbol and producing an outgoing context for the first RHS symbol;
   mapping, by a second mapping module executing on a computing device, the outgoing context from the first RHS symbol to an incoming context for a second RHS symbol in the list of symbols;
   parsing, by a second parser, the second RHS symbol and producing an outgoing context for the second RHS symbol, whereby the first parser and the second parser are top-down parsers; and
   mapping, by a third mapping module, the outgoing context for the second RHS symbol to an outgoing context for the LHS symbol.

16. The method of claim 15, wherein each of the outgoing and incoming context includes an intra-query context data structure.

17. The method of claim 15, wherein the mapping includes adding, replacing, or removing an association.

18. The method of claim 15, wherein the mapping includes adding, replacing, or removing a weighting.

19. The method of claim 15, wherein the mapping includes an identity function wherein no change is made to the context.

20. The method of claim 15, wherein the parsing includes continuously parsing an entire phrase in real time.

21. The method of claim 15, wherein each of the first parser and second parser provides a result, the results collectively forming an output of the semantic parser.

22. The method of claim 15, wherein the semantic parser is incremental.

23. A system for propagating context data in a top down semantic parser according to a context-free grammar, comprising:

a computing device comprising one or more processors, memory, a plurality of mapping modules, and a plurality of parsers, the computing device to:

receive a context by the semantic parser;

modify the context at one or more of each of the plurality of mapping modules, the plurality of mapping modules including a first mapping module and a last mapping module; and parse a portion of a rule at each of the plurality of parsers, wherein each of the mapping modules except the last mapping module provide a context to one of the plurality of parsers, and wherein each of the plurality of mapping modules except the first mapping module receive an incoming context that is output by one of the plurality of parsers, whereby each of the plurality of parsers are top-down parsers.

24. The system of claim 23, wherein the context propagates through each of the plurality of mapping modules and the plurality of parsers.

25. The system of claim 23, wherein the context includes an intra-query context.

26. The system of claim 23, wherein modifying the context includes adding, replacing, or removing an association within the context.

27. The system of claim 23, wherein modifying the context includes adding, replacing, or removing a weighting within the context.

28. The system of claim 23, wherein the context received by the semantic parser is for a conversation associated with a natural language query.

29. The system of claim 23, wherein at least one of the one or more mapping modules does not modify the context.

30. The system of claim 23, wherein each parser parses a symbol within the rule.

31. The system of claim 23, wherein the semantic parser is incremental.

* * * * *